US010331864B1

(12) United States Patent
Mellis et al.

(10) Patent No.: US 10,331,864 B1
(45) Date of Patent: Jun. 25, 2019

(54) WATERMARKING SYSTEMS AND METHODS

(71) Applicant: MLB Advanced Media, L.P., New York, NY (US)

(72) Inventors: Michael Mellis, Scarsdale, NY (US); Mitchell Schwartz, New York, NY (US)

(73) Assignee: MLB Advanced Media, L.P., New York, NY (US)

( * ) Notice: Subject to any disclaimer, the term of this patent is extended or adjusted under 35 U.S.C. 154(b) by 0 days.

(21) Appl. No.: 15/486,950

(22) Filed: Apr. 13, 2017

Related U.S. Application Data

(63) Continuation of application No. 13/336,555, filed on Dec. 23, 2011, now abandoned.

(60) Provisional application No. 61/427,414, filed on Dec. 27, 2010.

(51) Int. Cl.
*G06K 9/00* (2006.01)
*G06F 21/16* (2013.01)
*H04N 21/234* (2011.01)
*H04N 21/8358* (2011.01)
*H04N 21/254* (2011.01)
*G06F 16/58* (2019.01)

(52) U.S. Cl.
CPC .......... *G06F 21/16* (2013.01); *G06F 16/5866* (2019.01); *H04N 21/23418* (2013.01); *H04N 21/2541* (2013.01); *H04N 21/8358* (2013.01); *G06F 2221/0708* (2013.01); *G06F 2221/0737* (2013.01)

(58) Field of Classification Search
None
See application file for complete search history.

(56) References Cited

U.S. PATENT DOCUMENTS

| 3,241,270 | A | 3/1966 | Newman |
| 2006/0115108 | A1 | 6/2006 | Rodriguez et al. |
| 2008/0195315 | A1 | 8/2008 | Hu et al. |
| 2011/0117934 | A1 | 5/2011 | Mate et al. |
| 2011/0150292 | A1 | 6/2011 | Boncyk et al. |
| 2011/0188760 | A1 | 8/2011 | Wright et al. |

OTHER PUBLICATIONS

Images/pictures of San Francisco AT&T Park baseball venue, and a picture taken during Game 3 of the National League Championship Series between the Philadelphia Phillies and the San Francisco Giants Tuesday, Oct. 19, 2010, in San Francisco, e.g., sign of "AT&T Park" as the physical identifier is arranged in the center of the venue.*
Office Action dated Aug. 11, 2014 in related U.S. Appl. No. 13/336,555.
Final Office Action dated Apr. 6, 2015 in related U.S. Appl. No. 13/336,555.

(Continued)

*Primary Examiner* — Wei Wen Yang
(74) *Attorney, Agent, or Firm* — Foley & Lardner LLP

(57) ABSTRACT

A method for managing media rights of content recorded at a venue may include arranging physical identifiers at selected locations around the venue; and recording an image of an event occurring within the venue, wherein the image includes one or more of the physical identifiers, wherein processing of the image permits the physical identifiers to be used to identify the image.

19 Claims, 6 Drawing Sheets

(56) References Cited

OTHER PUBLICATIONS

Office Action dated Sep. 10, 2015 in related U.S. Appl. No. 13/336,555.
Final Office Action dated May 13, 2016 in related U.S. Appl. No. 13/336,555.

* cited by examiner

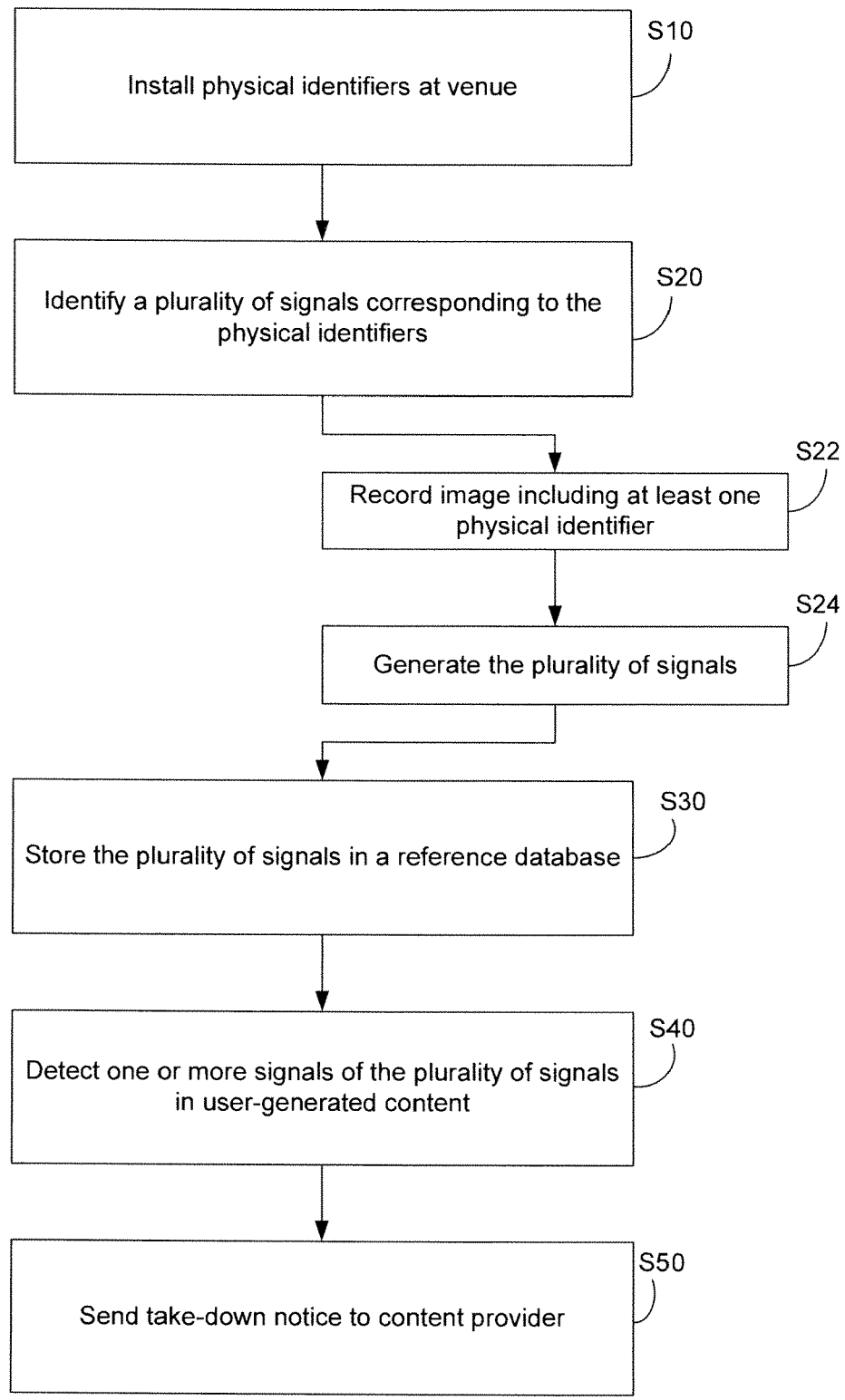

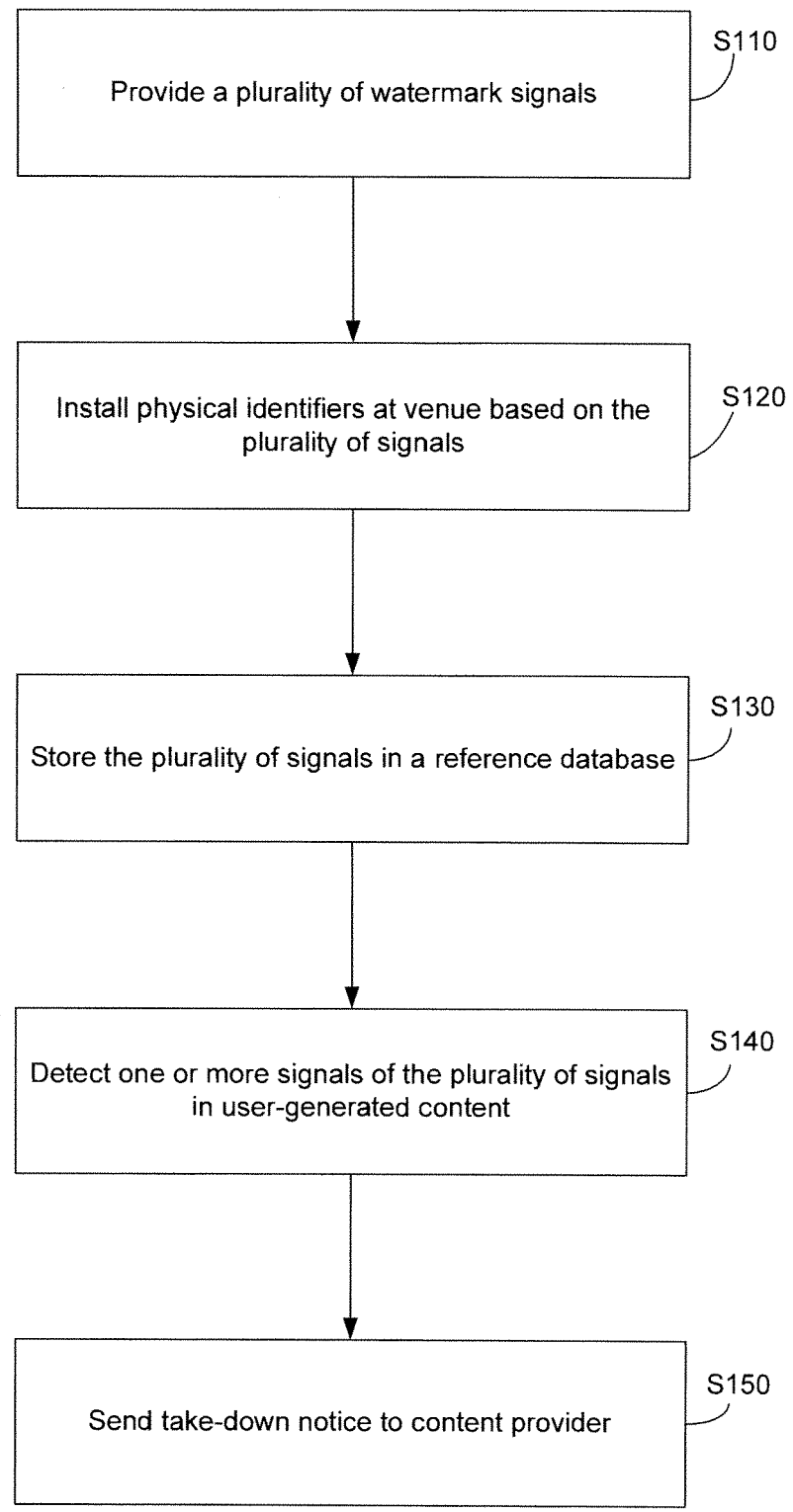

WATERMARKING SYSTEMS AND METHODS

CROSS-REFERENCE TO RELATED PATENT APPLICATIONS

This application is a continuation of U.S. application Ser. No. 13/336,555, filed Dec. 23, 2011; which claims the benefit of U.S. Provisional Application No. 61/427,414, filed Dec. 27, 2010; the disclosures of both of which are incorporated herein by reference in their entirety.

BACKGROUND

1. Field of the Invention

Embodiments of the present invention relate generally to systems and methods for managing media rights and, in specific embodiments, to watermarking systems and methods.

2. Related Art

Many sporting and other entertainment events televised and recorded for broadcast or subsequent rebroadcast are subject to copyright restrictions. With the advent of modern recording devices and communication systems, such broadcasts may be easily copied and retransmitted in violation of the copyright owners' rights. In many instances, operators of a file sharing server may be unaware that material being shared is subject to copyright, which hampers the practical ability to ensure that the site is not being used for unauthorized distribution.

Further, many mobile devices now include streaming and recording video capabilities. This enables spectators at sporting events, concerts, theatrical and dance productions, and the like to bootleg live events in violation of copyrights. For instance, spectators can use their mobile phones or the like to stream the event live or record the event and then upload the video to a user-generated content provider, such as YouTube, or other social media provider.

It is known in the art to encode information into media files, for example audio and video files, which serve to identify the file so that it can more readily be determined that the underlying content is subject to copyright restrictions. It is possible, however, for the identifying information to be removed through known signal processing techniques.

Accordingly, it would be advantageous to provide a more effective technique to identify copyrighted material or material that is otherwise owned by an entity to avoid unauthorized distribution.

SUMMARY

A method for managing media rights of content recorded at a venue may include, but is not limited to, any one or combination of: (i) arranging physical identifiers at selected locations around the venue; and (ii) recording an image of an event occurring within the venue, wherein the image includes one or more of the physical identifiers, wherein processing of the image permits the physical identifiers to be used to identify the image.

In various embodiments, processing may include creating signals from the images of the physical identifiers, which are matched against a database of recorded content, whereby the image may be identified.

In various embodiments, the method may include processing the image to create one or more signals corresponding to the one or more physical identifiers. In some embodiments, the method may include matching the one or more signals against a database of recorded content. In further embodiments, the method may include controlling a video object of the database if one of the one or more signals matches the video object.

In various embodiments, the event may be a sporting event. In some embodiments, the sporting event may be a baseball game.

In various embodiments, the venue may be a stadium. In some embodiments, the stadium may be a baseball stadium.

In various embodiments, the physical identifiers may comprise portions of the venue. In some embodiments, the portions of the venue may include at least one of poles, towers, lighting fixtures, advertisements, billboards, media equipment, landscaping, reflectors, painted or colored objects, textured coverings, lights, light bursts, lasers, and building materials.

In various embodiments, at least one of the physical identifiers may comprise a moveable object. In various embodiments, at least one of the physical identifiers may be fixed to the venue.

A system for managing media rights of content recorded at a venue may include, but is not limited to, a plurality of physical identifiers and an image capturing device. The plurality of physical identifiers may be arranged at selected locations around the venue. The image capturing device may be configured to record an image of an event occurring within the venue, wherein the image includes one or more of the physical identifiers, wherein processing of the image permits the identifiers to be used to identify the image.

In various embodiments, the image capture device may be associated with a processing center for processing of the images. In some embodiments, processing may include creating signals from the images of the physical identifiers, which are matched against a database of recorded content, whereby the image may be identified.

In various embodiments, the event may be a sporting event. In various embodiments, the venue may be a stadium. In various embodiments, the physical identifiers may comprise portions of the venue. In various embodiments, at least one of the physical identifiers may comprise a moveable object.

BRIEF DESCRIPTION OF THE DRAWINGS

FIG. 2A is flowchart of a process of managing media rights according to an embodiment of the present invention;

FIG. 2B is flowchart of a process of managing media rights according to an embodiment of the present invention;

DETAILED DESCRIPTION

Various embodiments of the present invention relate to media rights management systems and methods For instance, as described in detail below, physical identifiers are positioned in locations around a venue (e.g., stadium, arena, field, concert hall, theatre, dance studio, or the like) in which an event may be recorded or broadcast. These identifiers function as "watermarks" or "digital fingerprints" that uniquely identify images that are recorded and broadcast. These identifiers form part of the actual image, and thus cannot be easily removed without degrading the quality of the video. The identifiers can be detected by, for example, by using downstream video filters to determine whether media rights relating to an event occurring at the venue are being violated (e.g., being broadcast or otherwise aired without permission of the venue operator or other party who owns or is otherwise associated with such media rights).

Figure 1:
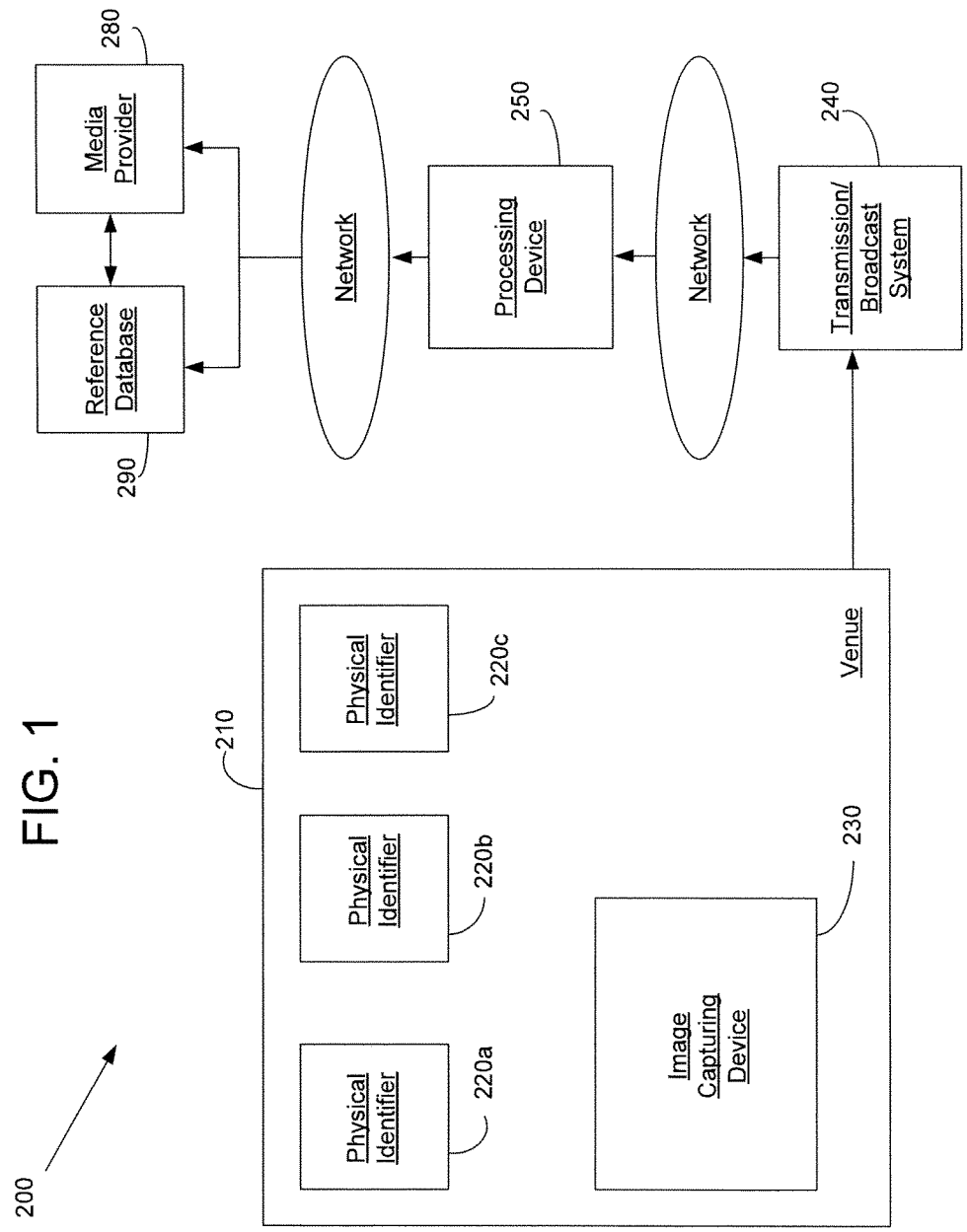
FIG. 1 is a block diagram of a media rights management system according to an embodiment of the present invention.

FIG. 1 is a block diagram of a media rights management system 200 according to an embodiment of the present invention. The system 200 is implemented at a venue 210, which may be a stadium, arena, field, concert hall, or the like. The system 200 may include a plurality of physical identifiers (e.g., 220a-220c) and one or more image capturing devices 230 (e.g., one or more conventional video cameras), and a transmission device 240 (which may be part of a transmission or broadcast system or the like), and a processing device 250. As described below, the processing device 250 is configured to process images that are transmitted so that it can be determined if the images relate, for example, to copyrighted content and/or to content recorded at the venue 210. Accordingly, the system 200 allows for management of media rights of video objects provided by a media provider 280, such as a user-generated content provider (e.g., YouTube, Facebook, MySpace, or the like).

Each of the physical identifiers provide a reference point for images or videos captured at the venue 210. In addition, the physical identifiers serve as message objects or the like for conveying one or more signals. In various embodiments, the one or more signals may be detectable in images or videos captured at the venue 210, as described below. For instance, the one or more signals may be a digital fingerprint or the like. Accordingly, any suitable digital fingerprinting technique, which can identify a video object based on fingerprints generated from characteristics (e.g., the physical identifiers or information related to such) extracted from the video object, may be used.

The physical identifiers may include, but are not limited to, poles, towers, lighting fixtures, advertisements, billboards, media equipment (e.g., video cameras), landscaping (inside or outside the playing field) or other naturally occurring objects, reflectors, painted/colored objects, textured coverings, building materials (e.g., bricks or cement), lights (of any suitable spectrum), light bursts, lasers, and/or the like. In some embodiments, the physical identifiers may include portions of the venue 210, such as seating areas that have been covered, tarped, or otherwise blocked, specific seats, or the like. For example, the physical identifiers could include seats that are discernable in a crowd, such as a seat colored orange in a section of all blue seats.

Thus, in some embodiments, the physical identifiers may be physical objects that are already part of or related to the venue 210. That is, such objects already have their own specific purpose, such as a lighting fixture. In other embodiments, the physical identifiers may be installed specifically for purposes of providing a signal. For example, the physical identifiers may be one or more poles positioned at the venue 210 for the sole purpose of providing a signal.

Preferably, the identifiers are disposed within the venue so that aspects of the event that are most likely to be recorded will include one or more of the identifiers. For example, one or more identifiers may be positioned directly behind a batter at a baseball game so that they will be included in images of the batter captured by a centerfield camera. Similarly, one or more identifiers may be positioned in the centerfield area, near first base and near third base, so that images of most action will include one or more identifiers.

Figure 3:
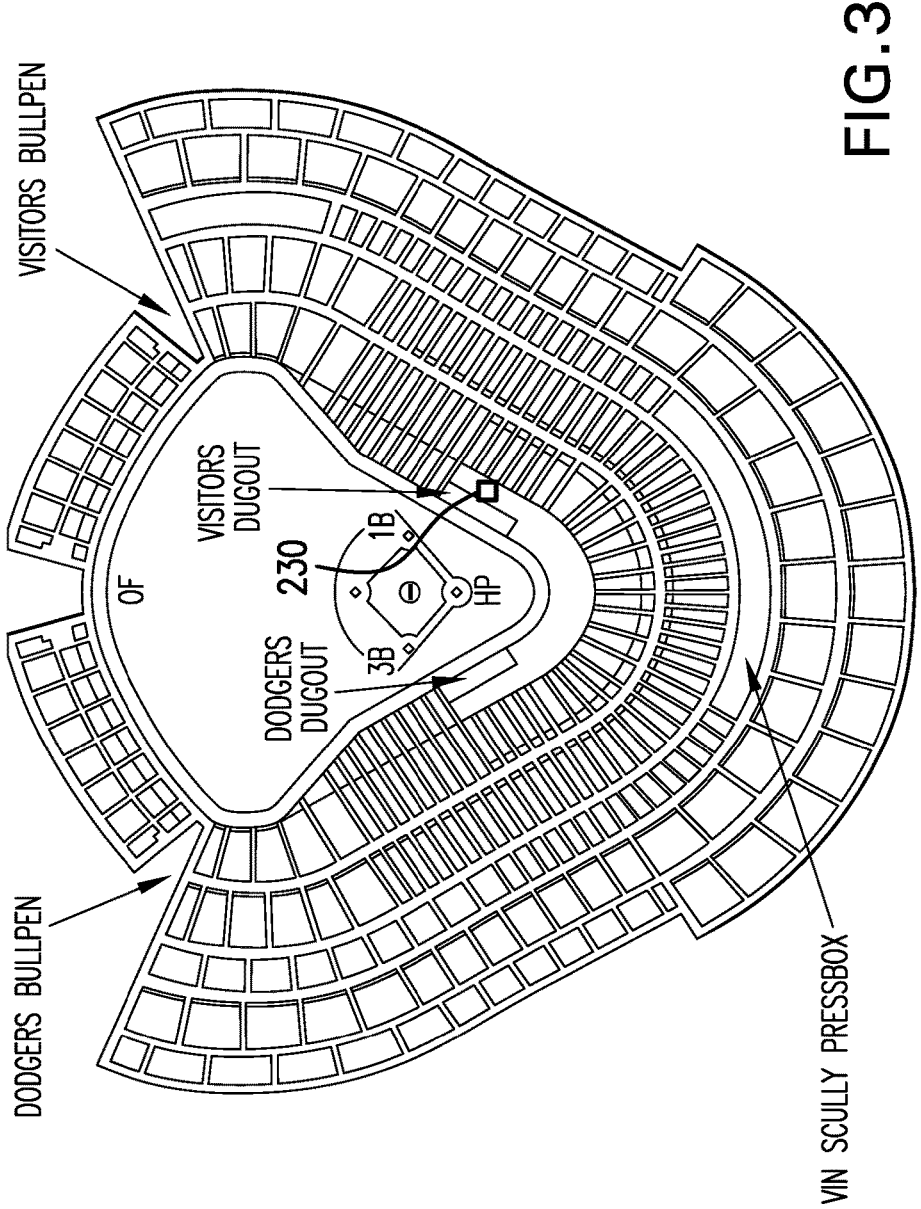
FIG. 3 is a seating chart of a baseball stadium demonstrating exemplary locations for installing physical identifiers according to an embodiment of the present invention.

The image capture device 230 is configured to capture information relating to the physical identifiers, such as their locations, for example relative to each other or to other known locations in the venue 210. In some embodiments, the image capture device 230 may be one or more video cameras used for recording video of an event at the venue 210 (e.g., a video camera positioned behind the Visitors' Dugout in FIG. 3). For instance, a typical professional baseball game has video of the game captured by at plurality of video cameras.

Each venue has an infrastructure connecting the various cameras to a transmission device 240, which may be part of a transmission or broadcast system. The transmission device 240 is configured to transmit the images from the capture devices 230. The images may be broadcast or otherwise transmitted as analog or digital signals according to known techniques. For example, the images may be broadcast by television networks in a digital or analog form, or may be streamed over a computer network, such as the Internet.

As generally illustrated in FIG. 1, the system includes a processing device 250. As described below, the processing device is configured to process the information transmitted, for example via a network connection, from the transmission device 240. In some embodiments, the processing device 250 may comprise a plurality of processing devices (e.g., computers) housed in one or more processing centers.

FIG. 2A is a flowchart of a process implementing the system 200 of FIG. 1. With reference to FIGS. 1 and 2A, in step S10, the plurality of physical identifiers are installed or otherwise positioned around the venue 210.

Once the physical identifiers are positioned, in step S20, one or more signals relating to the physical identifiers are generated and/or identified in any suitable manner. For instance, in step S22, the image capturing device 230 is positioned around the venue 210 to capture information relating to the physical identifiers, such as their locations, for example relative to each other or to other known locations in the venue 210. The information is transmitted to the processing device 250 via the transmission device 240. Accordingly, in step S24, the processing device 250 or the like may be configured in any suitable manner to process the information to provide the one or more signals. Examples of generating such signals are disclosed in (but not limited to) U.S. Pub. No. 2008/0040807, which is are herein incorporated by reference in its entirety.

In step S30, the one or more signals is stored in a reference database 290 or the like as one or more master signals. In some embodiments, the reference database 290 may be contained in a remote server or the like. Accordingly, the one or more signals may be transmitted to the reference database, for example, via a network connection or the like. In other embodiments, the reference database 290 may be local to the processing device 250. For example, the reference database 290 may be housed in a same processing center as the processing device 250.

In various embodiments, the reference database 290 may be part of the media provider 280, for instance, for use by the media provider 280 to implement the processes discussed herein. In other embodiments, the reference data may be associated with the media provider 280. For instance, the reference database may be maintained or owned by the entity (e.g., Major League Baseball) implementing the system 200.

Then, in step S40, any suitable video filtering technique may be employed to detect the one or more master signals in video objects provided by the media provider 280, such as on a user-generated content provider (e.g., YouTube, Facebook, MySpace, or the like). For example, fingerprints of such video objects can then be matched against the reference database 290 containing the master signals to identify the video object. Any suitable video filtering, fingerprinting, and/or identification technique may be used, examples of which are disclosed in (but not limited to) U.S. Pub. No. 2008/0040807, which is herein incorporated by reference in its entirety.

In step S50, if a fingerprint of a video object matches one of the master signals, then the system 200 is configured to carry out certain actions. For instance, in some embodiments, if there is a match, the system 200 is configured to send a take-down notice to the media provider 280 to have the video object removed. In other embodiments, if there is a match, the system 200 is configured to remove the video object automatically upon being matched with a master signal.

Various embodiments may be employed to prevent others (e.g., bootleggers) from learning, and thus avoiding, the physical identifiers. Such embodiments may be beneficial to prevent bootleggers or the like from intentionally avoiding known physical identifiers while capturing video, images, or the like. Likewise, such embodiments for instance, may also allow a video containing a particular set of physical identifiers to identify the date of the event.

For instance, in some embodiments, one or more of the physicals identifiers may be movable in between events or during an event. For instance, the physical identifiers may include one or more billboard-type trucks that can be positioned and moved around the venue 210.

In some embodiments, a first set of the plurality of physical identifiers may be used on one day (or portion of an event) while a second set of the plurality of physical identifiers may be used on a different day (or different portion of the event). For example, with reference to FIG. 3, a first physical identifier (near seating section 24), a second physical identifier (near seating section 28), and a third physical identifier (near seating section 33) may be used for a ballgame on Jul. 1, 2010. During a ballgame on Jul. 2, 2010, the first physical identifier (near the seating section 24), a fourth physical identifier (near seating section 36), a fifth physical identifier (near seating section 40), and a sixth physical identifier (near seating section 44) may be used.

In some embodiments, electronic displays in the venue (FIG. 1) may be used as one or more of the physical identifiers. For example, advertisements on electric billboards may be arranged in a certain pattern, color, or the like.

In some embodiments, one or more of the physical identifiers may be a venue employee or agent positioned at strategic locations such as a specific seat or other position at the venue 210 (FIG. 1). The venue employee or agent, for example, may be wearing clothing (e.g., a bright orange shirt) that is discernable in a crowd.

In various embodiments, because different seating areas offer different views or perspectives of the stadium or the like, multiple signals for representing these different views or perspectives may be generated. For instance with reference to FIG. 3, a first signal may be provided for any video that would be captured from a spectator sitting near third base 3B; a second signal for a view near first base 1B; a third signal for a view near home plate HP; and a fourth signal for a view near the outfield OF. For example, a first set of physical identifiers (e.g., near the seating sections 24, 28, and 33) may be positioned at locations in the expected field of view that a person sitting near third base 3B would want to capture a video or image while looking at the pitcher and the batter. Similarly, a second set of physical identifiers (e.g., near seating sections 23, 27, and 31) may be positioned at locations in the expected field of view that a person sitting near first base 1B would want to capture a video or image while looking at the pitcher and the batter. In the latter case, the image capture device 220 is positioned near the Visitors' Dugout, and a similar device is positioned near the Home Team Dugout for the former case.

Various embodiments relate to managing media rights on a user-generated content provider. However, the systems and methods discussed in the disclosure may be implemented with any media provider. In some embodiments, the system may be provide a reference database and compared with streaming video feeds. For example, the system could be used with a video-streaming devices. Thus, when a user of the video-streaming device attempts to stream a television broadcast of a baseball game (being played at a stadium where the physical identifiers are installed), media servers associated with the video-streaming device may, for example, access the reference database of master signals for comparison with the streamed video. If there is a match, the baseball game is not streamed as the user has intended. In such an example, the image capture device (e.g., 230 in FIG. 1) may be the same video cameras used to record the baseball game.

Returning to FIGS. 1 and 2A, although in some embodiments physical identifiers are positioned at a venue 210 (e.g., S10) and then a signal (e.g., S20) is provided, these steps may be performed in any suitable order. For instance, with reference to FIG. 2B, first in step S110, a signal (e.g., watermark signal) is provided. In some embodiments, the signal may include message data (e.g., payload or identification information). The signal may be used to determine a set of points sufficient to convey the signal. The signal may be mapped into the set of points in any suitable manner including, but not limited to, frequency analysis, quantitization (e.g., a root mean square measurement), and/or the like. Examples of providing such signals and other methods of watermarking and steganographic-embedding techniques are disclosed in (but not limited to) U.S. Pat. Nos. 6,198,832, 6,700,994, and 6,993,152 and U.S. Pub. No. 2003/0021439, all of which are herein incorporated by reference in their entirety.

Figure 4A:
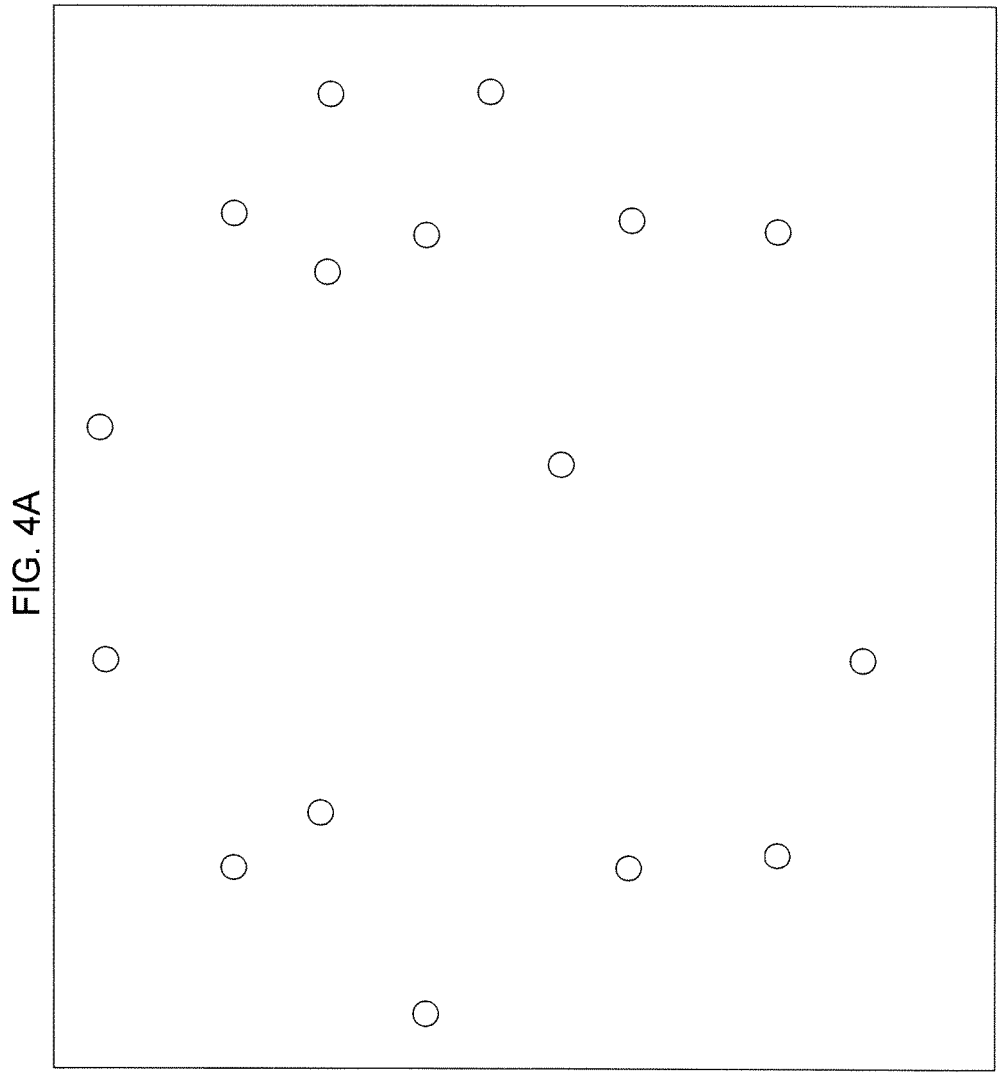
FIG. 4A is a template for installing physical identifiers according to an embodiment of the present invention.
Figure 4B:
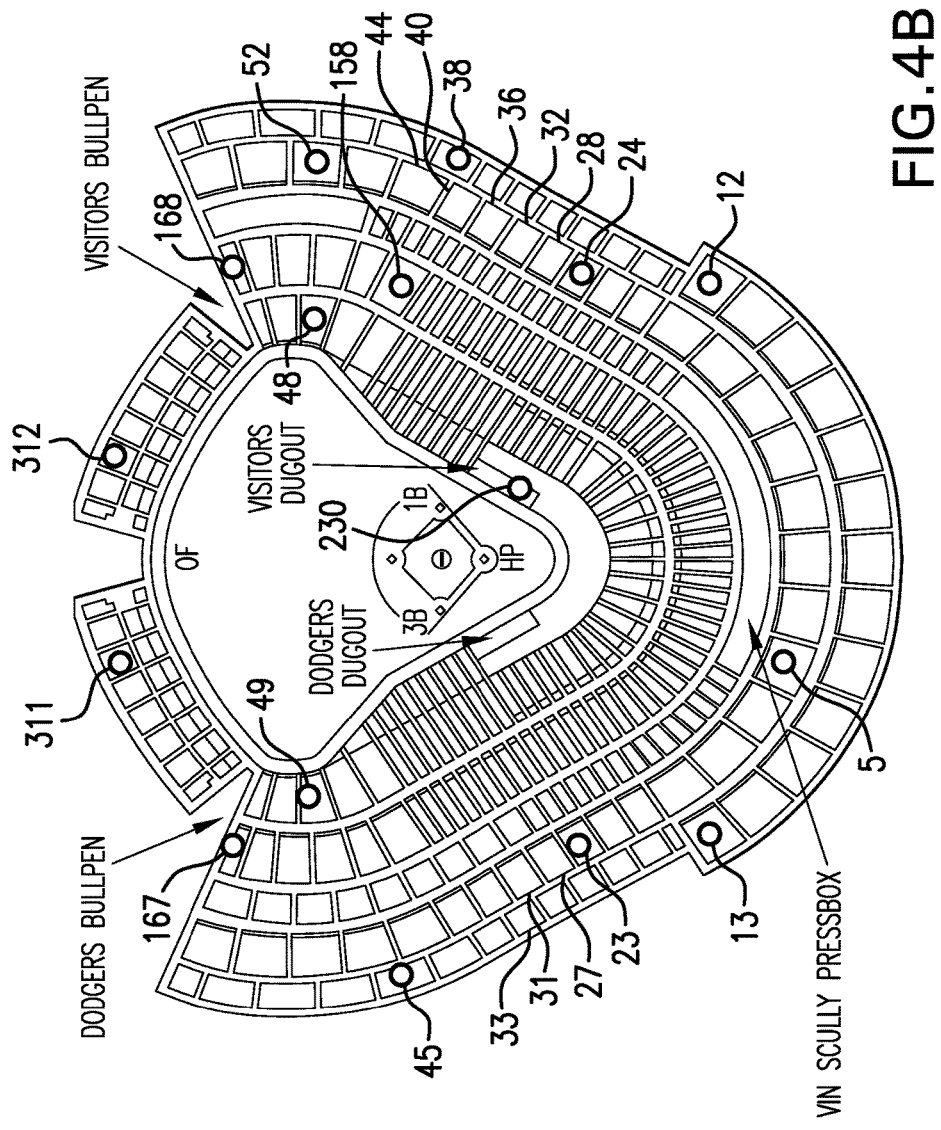
FIG. 4B illustrates locations to install physical identifiers in a baseball stadium according to an embodiment of the present invention.

The set of points may serve as a map or template for positioning the physical identifiers at locations corresponding to the set of points, an example of which is shown in FIG. 4A. As such, in step S120 of FIG. 2B, the physical identifiers are installed or otherwise positioned in and around the venue based on the set of points. For instance, for a set of points having a first, second, and third location, a physical identifier can be positioned at each of these locations, an example of which is shown in FIG. 4B. As in the process of FIG. 2A, the process of FIG. 2B, can continue, for example, by storing the signals S130 (or S30 in FIG. 2A), detect one or more signals of the plurality of signals in user-generated content step S140 (or S40 in FIG. 2A), and sending a take-down notice to content provider S150 (or S50 in FIG. 2A). Examples of techniques for detecting steganographic signals and/or or the signals discussed herein are disclosed in (but are not limited to) U.S. patent application Ser. Nos. 09/571,422 and 09/503,881, both of which are herein incorporated by reference in their entirety.

In various embodiments, the system is configured to determine if the images relate, for example, to copyrighted content. In other embodiments, the system is configured to determine if the images relate to content recorded at the venue. In such embodiments, this allows, for example, the system to determine if the image relates to content that is not necessarily copyright owned by the venue operator, sports league, concert promoter or the like.

Various embodiments include program products comprising computer-readable media for carrying or having computer-executable instructions or data structures stored thereon. Such computer-readable media can be any available media that can be accessed by a general purpose or special purpose computer or server. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. Combinations of the above are also to be included within the scope of computer-readable media. Computer-executable instructions comprise, for example, instructions and data that cause a general-purpose computer, special purpose computer, or special purpose processing device to perform a certain function or group of functions.

In addition to a system, various embodiments are described in the general context of methods and/or processes, which may be implemented in one embodiment by a program product including computer-executable instructions, such as program code, executed by computers in networked environments. The terms "method" and "process" may be synonymous unless otherwise noted. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

In some embodiments, the method(s) and/or system(s) discussed throughout may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers hand-held devices, multi-processor systems, microprocessor-based or programmable consumer electronics, network PCs, minicomputers, mainframe computers, and the like.

In some embodiments, the method(s) and/or system(s) discussed throughout may be operated in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices. In various embodiments, data may be stored either in repositories and synchronized with a central warehouse optimized for queries and/or for reporting, or stored centrally in a database (e.g., dual use database) and/or the like.

An exemplary system for implementing the method(s) discussed might include a general-purpose computing device in the form of a conventional computer, including a processing unit, a system memory, and a system bus that couples various system components including the system memory to the processing unit. The system memory may include read only memory (ROM) and random access memory (RAM). The computer may also include a storage medium, such as a solid state storage device and/or a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media may provide non-volatile storage of computer-executable instructions, data structures, program modules, and other data for the computer.

Various embodiments employing software and/or Web implementations may be accomplished with standard programming techniques with rule-based logic and other logic to accomplish the various database searching steps, correlation steps, comparison steps and decision steps. In addition, the words "component" or "module," as used herein, may encompass implementations using one or more lines of software code, hardware implementations, and/or equipment for receiving manual inputs.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A method for managing media rights of content recorded at a venue, the method comprising:
   determining a plurality of locations around physical premises of the venue to install physical identifiers based on most actions of events occur around the plurality of locations;
   installing physical identifiers at the determined locations around physical premises of the venue to identify content recorded at the venue;
   recording, by an image capturing device, an image of an event occurring within the venue, the image including one or more of the physical identifiers;
   generating, by one or more processors, one or more computer readable signals from the image including the one or more of the physical identifiers, the one or more signals indicating the one or more of the physical identifiers at the venue;
   matching, by the one or more processors, the one or more signals indicating the one or more of the physical identifiers at the venue against a database of recorded content;
   detecting, by the one or more processors, that a recorded content in the database of recorded content includes at least one of the one or more of the physical identifiers based at least in part on a result of the matching; and determining, by the one or more processors, that the recorded content is recorded at the venue based at least in part on the detecting that the recorded content includes the at least one of the one or more of the physical identifiers.

2. The method of claim 1, the method further comprising: controlling the recorded content in response to the determining that the recorded content is recorded at the venue.

3. The method of claim 1, wherein the event is a sporting event, and wherein the venue is a stadium.

4. The method of claim 3, wherein the sporting event is a baseball game, and wherein the stadium is a baseball stadium.

5. The method of claim 1, wherein the plurality of physical identifiers are a first set of physical identifiers, and the method further comprising:

positioning a second set of physical identifiers around the venue, wherein the second set of physical identifiers comprise portions of the venue.

6. The method of claim 5, wherein the portions of the venue includes at least one of poles, towers, lighting fixtures, advertisements, billboards, media equipment, landscaping, reflectors, painted or colored objects, textured coverings, lights, light burst, lasers, and building materials.

7. The method of claim 1, wherein at least one of the physical identifiers in the venue comprises a moveable object.

8. The method of claim 1, wherein at least one of the physical identifiers is fixed to the venue.

9. A system for managing media rights of content recorded at a venue, the system comprising:

a plurality of physical identifiers installed at a plurality of selected locations around physical premises of the venue to identify content recorded at the venue, wherein the plurality of selected locations are determined based on most actions of events occur around the plurality of selected locations;

an image capturing device configured to record an image of an event occurring within the venue, the image including one or more of the physical identifiers; and one or more processors configured to:

generate one or more computer readable signals from the image including the one or more of the physical identifiers, the one or more signals indicating the one or more of the physical identifiers at the venue;

match the one or more signals indicating the one or more of the physical identifiers at the venue against a database of recorded content;

detect that a recorded content in the database of recorded content includes at least one of the one or more of the physical identifiers; and determine that the recorded content is recorded at the venue based at least in part on the detecting that the recorded content includes the at least one of the one or more of the physical identifiers.

10. The system of claim 9, wherein the image capture device is associated with a processing center comprising the one or more processors for processing of the images.

11. The system of claim 9, wherein the event is a sporting event, and wherein the venue is a stadium.

12. The system of claim 9, wherein at least one of the physical identifiers in the venue comprises a moveable object.

13. A non-transitory computer-readable medium having machine instructions stored therein, the instructions when executed by one or more processors, causing the one or more processors to perform operations comprising:

generating one or more computer readable signals from an image recorded within a venue, the image including one or more physical identifiers, the one or more signals indicating the one or more physical identifiers, wherein the one or more physical identifiers are installed at one or more selected locations around physical premises of the venue to identify content recorded at the venue, and wherein the one or more selected locations are determined based on most actions of events occur around the selected locations;

matching the one or more signals indicating the one or more of the physical identifiers at the venue against a database of recorded content;

detecting that a recorded content in the database of recorded content includes at least one of the one or more of the physical identifiers; and determining that the recorded content is recorded at the venue based at least in part on the detecting that the recorded content includes the at least one of the one or more of the physical identifiers.

14. The method of claim 1, wherein the installing further comprises:

installing at least one of the physical identifiers at one of the selected locations within the venue: behind a batter at a baseball game, in the centerfield area, near a first base, or near a third base.

15. The method of claim 1, wherein the installing further comprises:

installing one or more of the physical identifiers at the selected locations within the venue such that images of most actions include the one or more physical identifiers, the selected locations comprising at least one of: behind a batter at a baseball game, in the centerfield area, near a first base, or near a third base.

16. The method of claim 1, wherein the locations of the physical identifiers are determined based on a determination that aspects of the event to be recorded include one or more of the physical identifiers.

17. The method of claim 1, wherein the plurality of physical identifiers are a first set of physical identifiers and the event is a first event, the method further comprising:

arranging a second set of physical identifiers for a second event.

18. The method of claim 1, wherein at least one of the physical identifiers in the venue comprises a moveable physical identifier, and wherein the movable physical identifier moves around in the venue during the event.

19. The method of claim 1, wherein at least one of the physical identifiers comprises a moveable physical identifier, the event is a first event, and the moveable physical identifier is positioned at a first selected location in the venue during the first event, the method further comprising:

positioning the moveable physical identifier at a second selected location in the venue during a second event.

\* \* \* \* \*